United States Patent
Duplys et al.

(10) Patent No.: US 10,514,979 B2
(45) Date of Patent: Dec. 24, 2019

(54) METHOD AND DEVICE FOR PROCESSING DATA

(71) Applicant: Robert Bosch GmbH, Stuttgart (DE)

(72) Inventors: Paulius Duplys, Markgroeningen (DE); Sebastien Leger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 14/753,261

(22) Filed: Jun. 29, 2015

(65) Prior Publication Data

US 2016/0004591 A1    Jan. 7, 2016

(30) Foreign Application Priority Data

Jul. 4, 2014   (DE) .................. 10 2014 213 071

(51) Int. Cl.
| | |
|---|---|
| H03M 13/19 | (2006.01) |
| G06F 11/10 | (2006.01) |
| G06F 21/75 | (2013.01) |
| H03M 13/00 | (2006.01) |

(52) U.S. Cl.
CPC .............. *G06F 11/10* (2013.01); *G06F 21/75* (2013.01); *H03M 13/19* (2013.01); *H03M 13/616* (2013.01); *H03M 13/618* (2013.01); *H03M 13/63* (2013.01)

(58) Field of Classification Search
CPC ...... G06F 11/10; G06F 11/1008; G06F 21/75; H03M 13/63; H03M 13/19; H03M 13/618; H03M 13/616; H03M 13/75; H04L 1/0057; H04L 1/0083

USPC ......................................................... 714/777
See application file for complete search history.

(56) References Cited

U.S. PATENT DOCUMENTS

| | | | | |
|---|---|---|---|---|
| 6,092,097 A * | 7/2000 | Suzuoka | ............... | G06F 8/4442 709/201 |
| 6,871,313 B2 * | 3/2005 | Gopalakrishnan | .... | H04L 1/0061 714/758 |
| 6,978,416 B2 * | 12/2005 | Widmer | ............... | H04L 25/4908 714/4.2 |
| 7,190,681 B1 * | 3/2007 | Wu | ..................... | H04L 12/5601 370/316 |
| 7,260,764 B2 * | 8/2007 | Chen | ..................... | H04L 1/0041 714/751 |
| 7,284,184 B2 * | 10/2007 | Gallezot | ............... | H04L 1/0045 714/762 |
| 7,346,835 B1 * | 3/2008 | Lobinger | .............. | H04L 1/0002 714/774 |
| 7,398,439 B2 * | 7/2008 | Kushida | ................. | G11C 29/42 714/718 |
| 7,962,965 B2 * | 6/2011 | Ohyama | .............. | G06K 19/073 380/265 |
| 8,341,502 B2 * | 12/2012 | Steiner | ................ | G06F 11/1012 714/755 |
| 8,996,957 B1 * | 3/2015 | Northcott | ............ | G06F 11/1012 714/763 |

(Continued)

*Primary Examiner* — Samir W Rizk
*Assistant Examiner* — Enam Ahmed
(74) *Attorney, Agent, or Firm* — Norton Rose Fulbright US LLP; Gerard Messina

(57) ABSTRACT

A method for processing data includes coding a data item to obtain a coded data item that includes a predefinable number of bits, influencing maximally k many bits of the coded data item to obtain a changed data item, decoding the changed data item by using a fault-correcting code to obtain a decoded data item, and processing the decoded data item.

11 Claims, 2 Drawing Sheets

(56) References Cited

U.S. PATENT DOCUMENTS

| | | | |
|---|---|---|---|
| 9,009,565 B1* | 4/2015 | Northcott | G11C 29/42 365/185.09 |
| 9,722,636 B2* | 8/2017 | Bertram | H03M 13/43 |
| 2003/0131304 A1* | 7/2003 | Li | H03M 13/2957 714/755 |
| 2005/0010847 A1* | 1/2005 | Shokrollahi | H03M 13/19 714/752 |
| 2008/0077839 A1* | 3/2008 | Gross | H03M 13/1105 714/755 |
| 2009/0132755 A1* | 5/2009 | Radke | G06F 11/1068 711/103 |
| 2009/0138785 A1* | 5/2009 | Sakai | H03M 13/1102 714/790 |
| 2010/0046594 A1* | 2/2010 | Hartwich | H04L 12/433 375/226 |
| 2010/0118795 A1* | 5/2010 | Hassan | H04L 1/0009 370/329 |
| 2010/0138255 A1* | 6/2010 | Podhajsky | G06Q 10/10 705/30 |
| 2011/0214037 A1* | 9/2011 | Okamura | H03M 13/116 714/777 |
| 2012/0044979 A1* | 2/2012 | Boasson | H04L 1/0045 375/222 |
| 2013/0173993 A1* | 7/2013 | Fujimoto | G11B 20/1833 714/764 |
| 2013/0326232 A1 | 12/2013 | Lewis et al. | |
| 2015/0149872 A1* | 5/2015 | Mittelholzer | G11C 29/70 714/773 |
| 2015/0286528 A1* | 10/2015 | Cai | G06F 11/1004 714/763 |

* cited by examiner

METHOD AND DEVICE FOR PROCESSING DATA

FIELD OF THE INVENTION

The present invention relates to a method for processing data. The present invention also relates to a device for processing data.

BACKGROUND

Known data processing devices, systems, and methods are used, among other things, for carrying out cryptographic processes or, in general, for processing security-relevant data, in particular also in the field of IT security. The systems and methods or, more precisely their hardware and software-based implementation in a target system, may be attacked by so-called side channel attacks, such as a microcontroller or the like. In the case of these side channel attacks, one or more physical parameters (e.g., power consumption, electromagnetic radiation, etc.) of a system to be attacked are detected and examined with regard to a correlation with secret data such as secret keys of cryptographic processes. An attacker is able to use that to obtain information about the secret key and/or the processed data. U.S. Pat. App. Pub. No. 2013/326232 is a publication that addresses side channel attacks.

Another category of attacks on the systems and methods involves the active introduction or injection of faults into the system while a method is carried out. These attacks are also referred to as "fault injection attacks."

SUMMARY

An object of the present invention is to provide a method and a device for processing data which are less susceptible to the noted attacks.

According to an example embodiment of the present invention, a method includes: coding a data item to be processed to obtain a coded data item including a predefinable number of bits, influencing maximally k many bits of the coded data item for the purpose of obtaining a changed data item, decoding the changed data item by using a fault-correcting code to obtain a decoded data item, and processing the decoded data item.

Influencing the coded data item with the goal of obtaining a changed data item makes side channel attacks and, in particular, also fault injection attacks more difficult by significantly increasing the effort needed for a successful attack. By influencing and subsequently decoding the coded data item according to the present invention, a considerable degree of fluctuations with regard to the point in time of when this processing step is carried out can be advantageously introduced, so that an analysis and thus a cryptographic attack are made considerably more difficult. Moreover, the utilization of coded data items according to the present invention as well as the influenced data items according to the present invention further shroud the data processed by the device, so that differential power analysis attacks, in particular, must be carried out a great deal more elaborately in order to achieve the same degree of insight as in systems that do not have the protection according to the present invention.

The conscious manipulation, in particular falsification, of the coded data items within the scope of the method according to the present invention itself has the particular advantage that, within the scope of a fault injection attack, an attacker is no longer able at all to place (further) faults in a targeted manner in the sense of the attack precisely into the processing sequence of the method according to the present invention, the fault injection attacks consequently coming to nothing or being at least made significantly more difficult. A successful fault injection attack requires knowledge of the exact point in time of the injection of a fault by the attacker into the system, e.g., the point in time at which a processing step which is the subject matter of the fault injection attack is carried out or at which the data to be ascertained by the attacker are processed (e.g., written into a register). Finding these points in time is made significantly more difficult by the conscious manipulation of the coded data items according to the present invention.

In an example embodiment, the step of coding takes place chronologically immediately prior to the step of influencing. Alternatively or additionally, the coding can also take place chronologically and/or spatially separated from the influencing. In another example embodiment, one or more coded data items are, for example, stored in a table or a separate memory and designed to be retrievable for the method according to the present invention. In another example embodiment, some steps of the method according to the present invention are carried out using a first component (first microcontroller or first function block of a field programmable gate array (FPGA)), while other steps of the method according to the present invention are carried out using a second component (second microcontroller or second function block of the same FPGA, etc.).

In one advantageous example embodiment, a fault-correcting code, in particular a Hamming code, is used for the step of coding. In one preferred variant, the codes used allow for the influencing according to the present invention of maximally k many bits to be corrected again at least partially, preferably completely, i.e., to be reversed.

Alternatively or additionally, the codes used make it possible to detect or to correct a deletion of one or more bit(s) of the coded data item. Examples of these codes are the so-called "marker codes."

In another example embodiment, the step of influencing includes an inverting and/or a deleting of maximally k many bits of the coded data item.

In another example embodiment, the step of processing includes carrying out a cryptographic method or a part of a cryptographic method or also comparing data with predefinable reference data.

For example, the step of processing can include carrying out the SubBytes operation of advanced encryption standards (AES) and the like.

In another advantageous example embodiment, the coded data item, the changed data item, and/or the decoded data item is/are stored at least temporarily. For this purpose, in an example embodiment, internal and/or external memories of the device are provided. Internal memories can be registers of an arithmetic unit or of a processor of the device according to an example embodiment. Furthermore, the memory can be a direct access memory (e.g., random access memory (RAM)) or also a non-volatile memory such as a flash memory, for example, and the like.

In another advantageous example embodiment, the influencing is carried out as a function of a deterministic and/or stochastic process, which makes cryptographic attacks even more difficult. Particularly advantageously, the influencing can be carried out as a function of a solely deterministic process, e.g., as a function of a pseudo stochastic process and the like. In this way, the provision of a source of real random numbers or a high-grade source of average information content can be advantageously dispensed with. Initialization values for the pseudo stochastic process can, for example, be stored in the device or assigned to the device in any other way, for example as a function of a serial number of the device and the like.

According to an example embodiment, a device is configured to perform the described method.

Example embodiments of the present invention are explained below with reference to the drawings.

DETAILED DESCRIPTION

Figure 1:
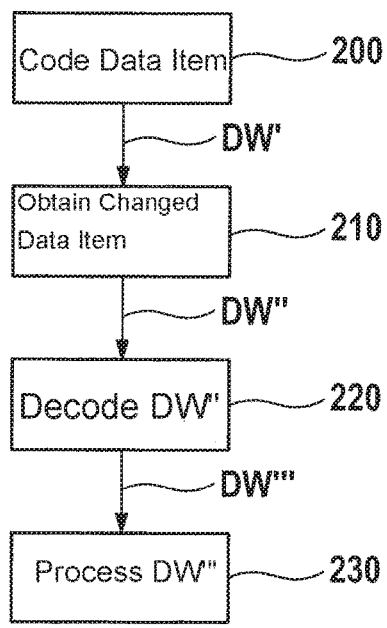
FIG. 1 is a flow chart of a method according to an example embodiment of the present invention.
Figure 2:
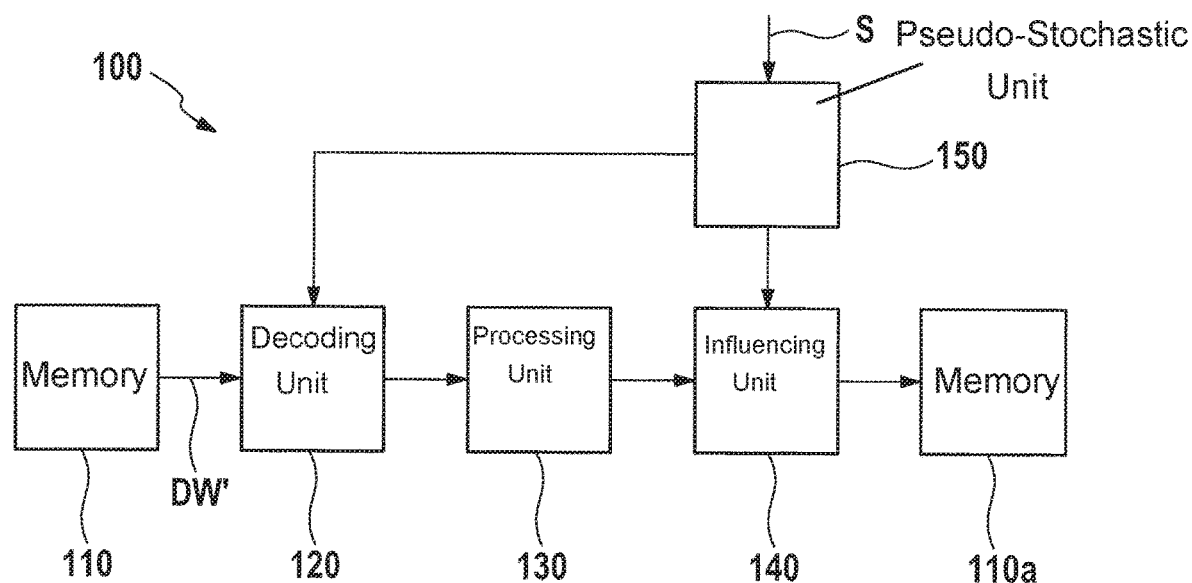
FIG. 2 is a block diagram of a device according to an example embodiment the present invention.

FIG. 1 illustrates a method carried out using a data processing device 100 of FIG. 2, according to an example embodiment of the present invention. In step 200, a data item which is to be processed by data processing device 100 is coded for the purpose of obtaining a coded data item DW' including a predefinable number of bits. The data item can in general represent any arbitrary bit sequence. In preferred example embodiments, the data item includes a bit sequence of a constant length of 8, 16, or 32 bits, for example. Other values can be used instead.

In step 210, maximally k many bits of the coded data item are influenced for the purpose of obtaining a changed data item DW". Advantageously, influencing 210, and thus the falsification of the coded data item, takes place consciously for the purpose of shrouding the data that are actually processed by device 100. In this way, side channel attacks and fault injection attacks are made significantly more difficult because essential processing steps of device 100 are not carried out directly using the (genuine) data items, but using changed data items DW" or data derived therefrom, for example.

In step 220, changed data item DW" is decoded by using a fault-correcting code for the purpose of obtaining a decoded data item DW'''. Particularly preferably, steps 200, 210, and 220 are coordinated in such a way that in step 220, the recovery, i.e., a fault-free decoding, of the data item from 200 is possible. In one example embodiment, a corresponding code, e.g., a Hamming code or a marker code, with suitable parameters is selected for this purpose and a value for parameter k of step 210 of influencing is established as a function of the selected code or its parameters.

In step 230, decoded data item DW''', which is preferably identical to the data item which was input as an input variable in step 200 of coding, is ultimately processed.

In one preferred example embodiment, a fault-correcting code, in particular a Hamming code or a marker code, is used for step 200 of coding. In an advantageous example embodiment, step 210 of influencing includes an inverting and/or a deleting of maximally k many bits of the coded data item.

In an advantageous example embodiment, step 230 of processing includes carrying out a cryptographic method or a part of a cryptographic method such as the SubBytes routine of the AES algorithm. Alternatively or additionally, step 230 of processing can provide for a comparison of data with predefinable reference data, e.g., the comparison of an identification which is input by a user with a reference identification which is, for example, stored in memory 110 (FIG. 2) of device 100 and from which the data item can be derived, for example.

In an example embodiment, coded data items and/or changed data items and/or decoded data items are stored at least temporarily, preferably in a memory 110 or 110a of device 100 according to FIG. 2.

In a particularly preferred example embodiment, influencing 210 is carried out as a function of a deterministic process, e.g., as a function of a pseudo stochastic process. Alternatively or additionally, stochastic processes can also be used.

FIG. 2 is a block diagram of a device 100 according to an example embodiment of the present invention. Device 100 includes a memory 110, which is a register memory or a RAM memory or also a non-volatile memory such as a flash memory or the like, or combinations therefrom. According to an example embodiment, previously coded data items DW' are stored in memory 110, for example in a coding table or the like. Previously coded data items DW' can be obtained, for example, by carrying out step 200 according to FIG. 1.

Furthermore, device 100 according to FIG. 2 includes a decoding unit 120, which is designed to carry out decoding step 220 according to FIG. 1. Decoding unit 120 preferably performs a decoding that reverses the influencing of maximally k many bits of the coded data item, which device 100 carried out in step 210, this being made possible by using a fault-correcting code (e.g., a hamming code or a marker code).

According to an example embodiment, device 100 furthermore includes a processing unit 130 which is designed to carry out processing step 230 of FIG. 1.

Furthermore, device 100 preferably includes an influencing unit 140 which is designed to carry out step 210 of influencing according to FIG. 1. For example, output data of processing unit 130 can thus be changed again, if necessary, after being previously coded (for example in step 200 of FIG. 1), in the sense of the present invention for the purpose of making side channel attacks and fault injection attacks more difficult. Output data of processing unit 130 and/or influenced output data can be stored in a memory area 110a for later processing, for example. Alternatively or additionally, this type of data can also be stored in memory 110 and subjected to the previously described processing sequence by components 110, 120, 130, 140.

In an advantageous example embodiment, device 100 includes a pseudo stochastic unit 150 designed to provide pseudo random numbers for the purpose of controlling influencing 210 by influencing unit 140, for example.

Alternatively or additionally, pseudo stochastic unit 150 can also have an effect on decoding unit 120 for the purpose of stochastically changing, e.g., prolonging or shortening, the times of when the decoding steps of decoding unit 120 are carried out, for example.

According to one example variant, pseudo stochastic unit 150 also includes a seed unit (not shown) which provides a seed ("initialization") value S for the operation of pseudo stochastic unit 150. The seed unit can, for example, store a device-specific (or a batch-specific) initialization value S defined during the manufacture of device 100 and stored in it. In an example variant, device 100 or its seed unit even changes the initialization value according to a predefinable process and/or (pseudo) stochastically.

Figure 3:
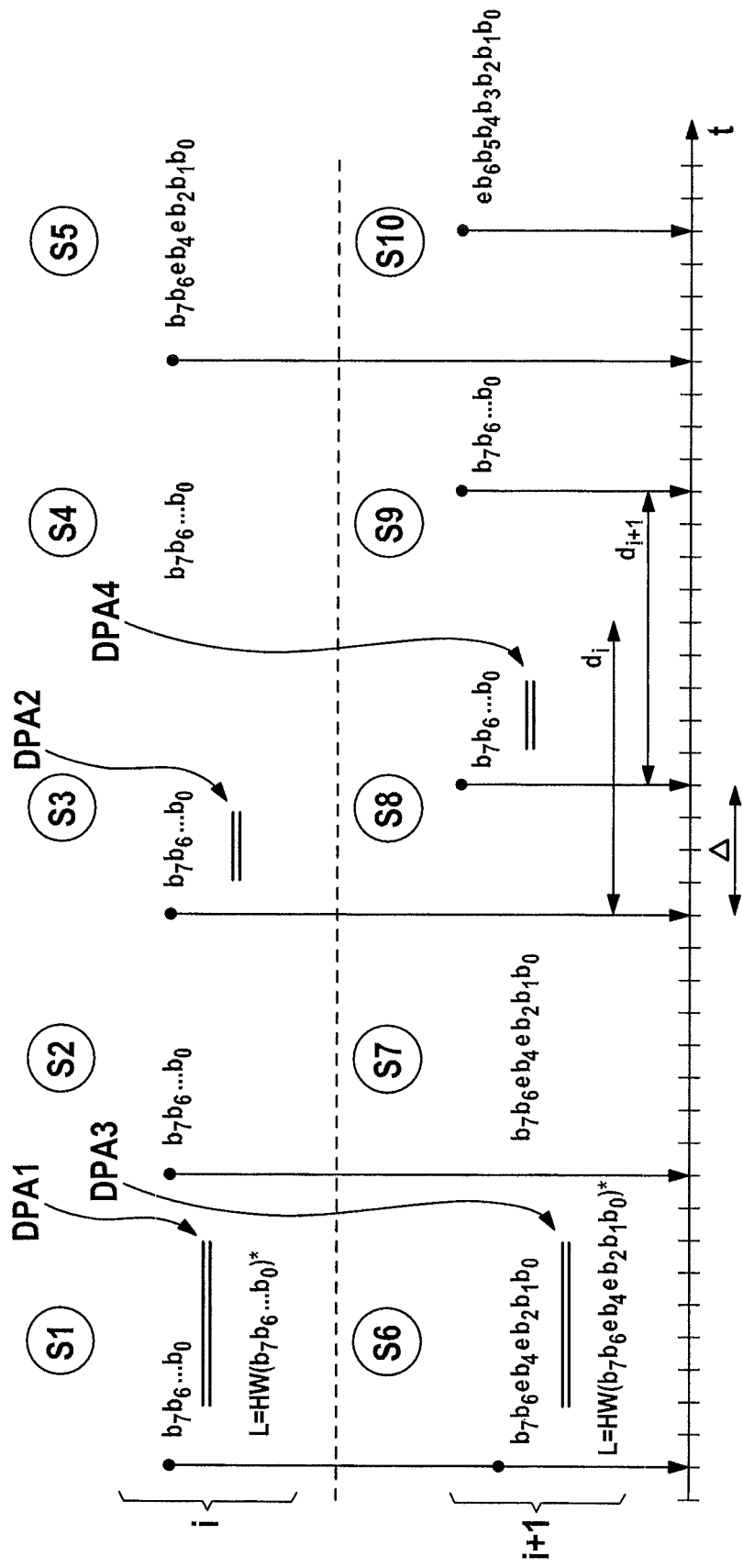
FIG. 3 schematically shows a sequence according to an example embodiment of the present invention.

FIG. 3 schematically shows chronological working sequences of a device 100 according to an example embodiment of the present invention. The sequences include a first sequence of processing steps S1, ..., S5 of a first processing cycle i and a second sequence of processing steps S6, ..., S10 of a second processing cycle i+1.

Initially, first processing cycle i is observed. In step S1, a previously coded data item composed of data bits $b_0$, $b_1$, $b_2$, ..., $b_7$ is loaded from a memory 110 (FIG. 2) of device 100, for example into a central processing unit (CPU) register of an arithmetic unit of device 100.

During this process, an attacker usually has the possibility of a side channel attack, e.g., according to the principle of the differential power analysis (dpa), by detecting and evaluating an electrical energy intake of device 100 or its arithmetic unit during step S1, for example. A suitable time window is provided with reference symbol DPA1 in FIG. 3. The following expression can therefore be assumed for a resulting leakage L1 in the cryptographic sense (side channel leakage): $L1=HW(b_0, b_1, b_2, ..., b_7)$, where $HW(x)$ is the Hamming weight of data item x. Consequently, leakage L1 is thus in step S1 a function of the Hamming weight of the loaded data item, for example, which contains data bits $b_0, b_1, b_2, ..., b_7$.

In step S2, the data item which was previously loaded in step S1 is decoded by decoding unit 120 (FIG. 2). In step S3, a processing 230 takes place by processing unit 130. During step S3, an attacker again receives an advantageous opportunity for a side channel attack. A suitable time window is provided with reference symbol DPA2 in FIG. 3.

In step S4, an influencing according to the present invention of the processed data is carried out so that from step S4 to step S5 a change results in the bit sequence from $b_0, b_1, b_2, ..., b_6, b_7$ toward $b_0, b_1, b_2, e, b_4, e, b_6, b_7$, bit positions e each representing an influencing according to the present invention of previously present bit positions $b_3, b_5$. The change in the corresponding bit positions which is consciously carried out in the present case according to the present invention is comparable to an injection of bit faults into the data item processed according to the present invention such as the ones also occurring during fault injection attacks. In contrast thereto, the present influencing, however, was carried out consciously under control of device 100 without an attacker being able to easily gain knowledge thereof. In this way, the processed data are shrouded and effective cryptographic attacks are made more difficult.

In step S5 according to FIG. 3, the data item changed in this way is ultimately stored in a memory 110 (FIG. 2) of device 100 by writing the data item from a register memory of the arithmetic unit of the device into (different) memory area 110, for example. Alternatively or additionally, copying from one register to another register, etc., is also conceivable for step S5.

Steps S1-S5 are, for example, carried out within a first processing cycle i of device 100 according to an example embodiment of the present invention. In a subsequent processing cycle i+1, steps S6-S10 are carried out which are described in the following in greater detail.

In step S6, the changed data item, which was stored previously in step S5, is loaded from memory 110 for further processing. Analogously to step S1, an attacker also has the possibility of a side channel attack in step S6, e.g., according to the principle of the differential power analysis (dpa), by detecting and evaluating an electrical energy intake of device 100 or its arithmetic unit during step S6, for example. A suitable time window is provided with reference symbol DPA3 in FIG. 3. The following expression can therefore be assumed for a resulting leakage L2 in the cryptographic sense (side channel leakage): $L2=HW(b_0, b_1, b_2, e, b_4, e, b_6, b_7)$. It is apparent that leakage L2, which is ascertainable in step S6, is considerably different from the leakage from step S1, i.e., L2 L1, which is due to the influencing according to the present invention (step S4) prior to storage (step S5). The application of the method according to the present invention thus advantageously brings about the introduction of a significant, in any case not-disappearing, noise into the leakage so that in the case of device 100 according to the present invention, a considerably greater effort is required than in the case of conventional devices in order to ascertain the same degree of usable leakage information in device 100.

Subsequently, the changed data item is decoded in step S7 by decoding unit 120 according to the present invention (FIG. 2). A processing is ultimately carried out in step S8 by processing unit 130 and in step S9, the processed data obtained in the process are again subjected to an influencing by influencing unit 140. In step S10, the data which are further influenced in this way and in which case bit sequence $b_0, b_1, b_2, b_3, b_4, b_5, b_6$, e is involved are finally stored in a memory 110 or in a further memory area 110a.

In a particularly preferred example embodiment, in addition to influencing 210 (FIG. 1), decoding 220 is carried out in such a way that a time for the decoding of the changed data item is not constant. According to FIG. 3, step S2 from cycle i, for example, assumes a first processing duration, while comparable step S7 from subsequent cycle i+1 assumes a second processing duration which is different from the first processing duration, whereby delays di, di+1, which are relevant for each of subsequent steps S3 and S8 and which are different from each other, ensue so that a time window DPA4 which is favorable for a side channel attack accordingly also shifts (compared to DPA2) from cycle i to cycle i+1. Since an attacker usually initially does not have any information about this non-constant decoding duration either, a cryptographic attack is made more difficult in this way.

The non-constant decoding duration previously described can, for example, also be achieved by introducing (pseudo) stochastic delays with the aid of unit 150 (FIG. 2) which can act on unit 120.

In general, the measures according to the present invention can be implemented both as software (e.g., for the arithmetic unit of device 100) or also as hardware (device 100 itself or additional components) or a combination thereof.

With the aid of the method according to the present invention, differential power analysis attacks and fault injection attacks on device 100 according to the present invention are advantageously made more difficult because decoded data items are not always processed, but rather processing is of coded data items and, moreover, data items which are influenced according to the present invention and which contain bit faults or deviations with regard to the regularly coded data items. With the aid of the provision according to the present invention of the decoding unit and using codes which make possible a subsequent fault correction, a plurality of different (pseudo) stochastically influenced data items can be processed in this way, thus further reducing the chances of success of dpa or fault injection attacks or making these attacks considerably more expensive.

Another advantage of the present invention is that the measures which make device 100 more robust can be preferably also carried out individually, i.e., differently for each example of device 100, so that findings obtained from dpa attacks which were carried out previously against a first device 100 are not easily transferrable to a second device 100 of the same type.

By applying the principle according to the present invention, hardware-based and/or software-based devices as well as combinations therefrom, and, for example, ASICs and FPGAs, and the like, can in general be made more robust.

Particularly advantageously, the application of the principle according to the present invention makes dpa attacks as well as fault injection attacks more difficult at the same time.

What is claimed is:

1. A method for processing data, the method comprising:
    coding a data item to obtain a coded data item that includes a predefinable number of bits;
    influencing bits of the coded data item to obtain a changed data item through a falsifying process that involves replacing a select number of genuine bits of the coded data with a respective bit fault;
    decoding the changed data item by using a fault-correcting code to obtain a decoded data item, wherein the decoding includes decoding the bit faults and the genuine bits; and
    processing the decoded data item, wherein:
        the coding is performed prior to the influencing,
        the decoding is carried out in such a way that the decoding of the changed data item is not constant between consecutive performances of the decoding,
        a first of the consecutive performances of the decoding occurs in a first processing duration,
        a second of the consecutive performances of the decoding occurs in a second processing duration that is different than the first processing duration, and
        a difference between the first processing duration and the second processing duration is caused by introducing pseudo stochastic delays into the decoding by a pseudo stochastic unit.

2. The method of claim 1, wherein for the step of coding, a fault-correcting code is used, in particular a Hamming code.

3. The method of claim 1, wherein the step of influencing includes at least one of inverting and deleting bits of the coded data item.

4. The method of claim 1, wherein the step of processing includes carrying out at least a part of a cryptographic method or comparing data with predefinable reference data.

5. The method of claim 1, wherein at least one of the coded data item, the changed data item, and the decoded data item is stored at least temporarily.

6. The method of claim 1, wherein the influencing is carried out as a function of at least one of a deterministic process and a stochastic process.

7. A device for processing data, the device comprising:
    processing circuitry, wherein the processing circuitry is configured to:
        code a data item to obtain a coded data item that includes a predefinable number of bits;
        influence bits of the coded data item to obtain a changed data item through a falsification that involves replacing a select number of genuine bits of the coded data with a respective bit fault;
        decode the changed data item by using a fault-correcting code to obtain a decoded data item, wherein the decoding includes decoding the bit faults and the genuine bits; and process the decoded data item, wherein:
            the coding is performed prior to the influencing,
            the decoding is carried out in such a way that the decoding of the changed data item is not constant between consecutive performances of the decoding,
            a first of the consecutive performances of the decoding occurs in a first processing duration,
            a second of the consecutive performances of the decoding occurs in a second processing duration that is different than the first processing duration, and
            a difference between the first processing duration and the second processing duration is caused by introducing pseudo stochastic delays into the decoding by a pseudo stochastic unit.

8. The device of claim 7, wherein the coding includes use of a fault-correcting code.

9. The device of claim 8, wherein the fault-correcting code is a Hamming code.

10. The device of claim 7, wherein the influencing includes at least one of inverting and deleting bits of the coded data item.

11. The device of claim 7, further comprising a memory, wherein the processing circuitry is configured to store at least one of the coded data item, the changed data item, and the decoded data item at least temporarily in the memory.

* * * * *